United States Patent
Hegde et al.

(10) Patent No.: US 11,144,395 B2
(45) Date of Patent: Oct. 12, 2021

(54) AUTOMATIC DATA PRESERVATION FOR POTENTIALLY COMPROMISED ENCODED DATA SLICES

(71) Applicant: International Business Machines Corporation, Armonk, NY (US)

(72) Inventors: Harsha Hegde, Buffalo Grove, IL (US); Robert T. Veitch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 297 days.

(21) Appl. No.: 16/377,674

(22) Filed: Apr. 8, 2019

(65) Prior Publication Data

US 2020/0319971 A1    Oct. 8, 2020

(51) Int. Cl.
| | |
|---|---|
| *G06F 11/00* | (2006.01) |
| *G06F 11/10* | (2006.01) |
| *G06F 11/14* | (2006.01) |
| *H04L 29/06* | (2006.01) |
| *G06F 21/64* | (2013.01) |
| *G06F 21/55* | (2013.01) |
| *G06F 21/62* | (2013.01) |

(52) U.S. Cl.
CPC ...... *G06F 11/1088* (2013.01); *G06F 11/1471* (2013.01); *G06F 21/552* (2013.01); *G06F 21/554* (2013.01); *G06F 21/6227* (2013.01); *G06F 21/64* (2013.01); *H04L 63/101* (2013.01)

(58) Field of Classification Search
CPC .... G06F 11/14; G06F 11/142; G06F 11/1479; G06F 11/18; G06F 11/20; G06F 11/1088; G06F 11/1471; G06F 21/552; G06F 21/6227; G06F 21/554; G06F 21/64; H04L 63/101
USPC ...................................................... 714/1–57
See application file for complete search history.

(56) References Cited

U.S. PATENT DOCUMENTS

| | | | |
|---|---|---|---|
| 8,181,247 B1 | 5/2012 | Pavlyushchik et al. | |
| 8,495,037 B1 | 7/2013 | Westenberg | |
| 8,782,227 B2 * | 7/2014 | Resch | G06F 11/1092 709/225 |
| 2006/0277184 A1 | 12/2006 | Faitelson et al. | |

(Continued)

*Primary Examiner* — Sarai E Butler
(74) *Attorney, Agent, or Firm* — Anthony England; Andrew D. Wright; Roberts Calderon Safran & Cole, P.C.

(57) ABSTRACT

A method includes detecting, by a security module of a dispersed storage network (DSN), a potentially compromised encoded data slice (EDS) of a set of EDSs. The potentially compromised EDS is stored in a storage unit of a set of storage units of the DSN. The method further includes monitoring other storage units of the set of storage units to detect one or more other potentially compromised EDSs of the set of EDSs. When the one or more other potentially compromised EDSs are detected, the method includes determining a data compromise threat level based on the potentially compromised EDSs and the one or more other potentially compromised EDSs and enabling an automatic data preservation protocol based on the data compromise threat level. The automatic data preservation protocol includes one or more of: one or more data preservation options, one or more data tracking options, and one or more notification options.

20 Claims, 7 Drawing Sheets

(56) References Cited

U.S. PATENT DOCUMENTS

| | | | |
|---|---|---|---|
| 2011/0055661 A1* | 3/2011 | Grube | G06F 11/1088 |
| | | | 714/763 |
| 2013/0198130 A1* | 8/2013 | Resch | G06F 3/0619 |
| | | | 707/609 |
| 2013/0198588 A1* | 8/2013 | Resch | G06F 3/0619 |
| | | | 714/763 |
| 2016/0352748 A1 | 12/2016 | Hwang et al. | |
| 2017/0004041 A1* | 1/2017 | Resch | G06F 3/064 |
| 2017/0171105 A1* | 6/2017 | Baptist | H04L 67/10 |
| 2018/0077173 A1* | 3/2018 | Motwani | H04L 63/1416 |

\* cited by examiner

AUTOMATIC DATA PRESERVATION FOR POTENTIALLY COMPROMISED ENCODED DATA SLICES

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In an object storage system, users and action have to be authenticated and authorized. Once authenticated and authorized, requests are carried out by the system.

DETAILED DESCRIPTION OF THE INVENTION

Figure 1:
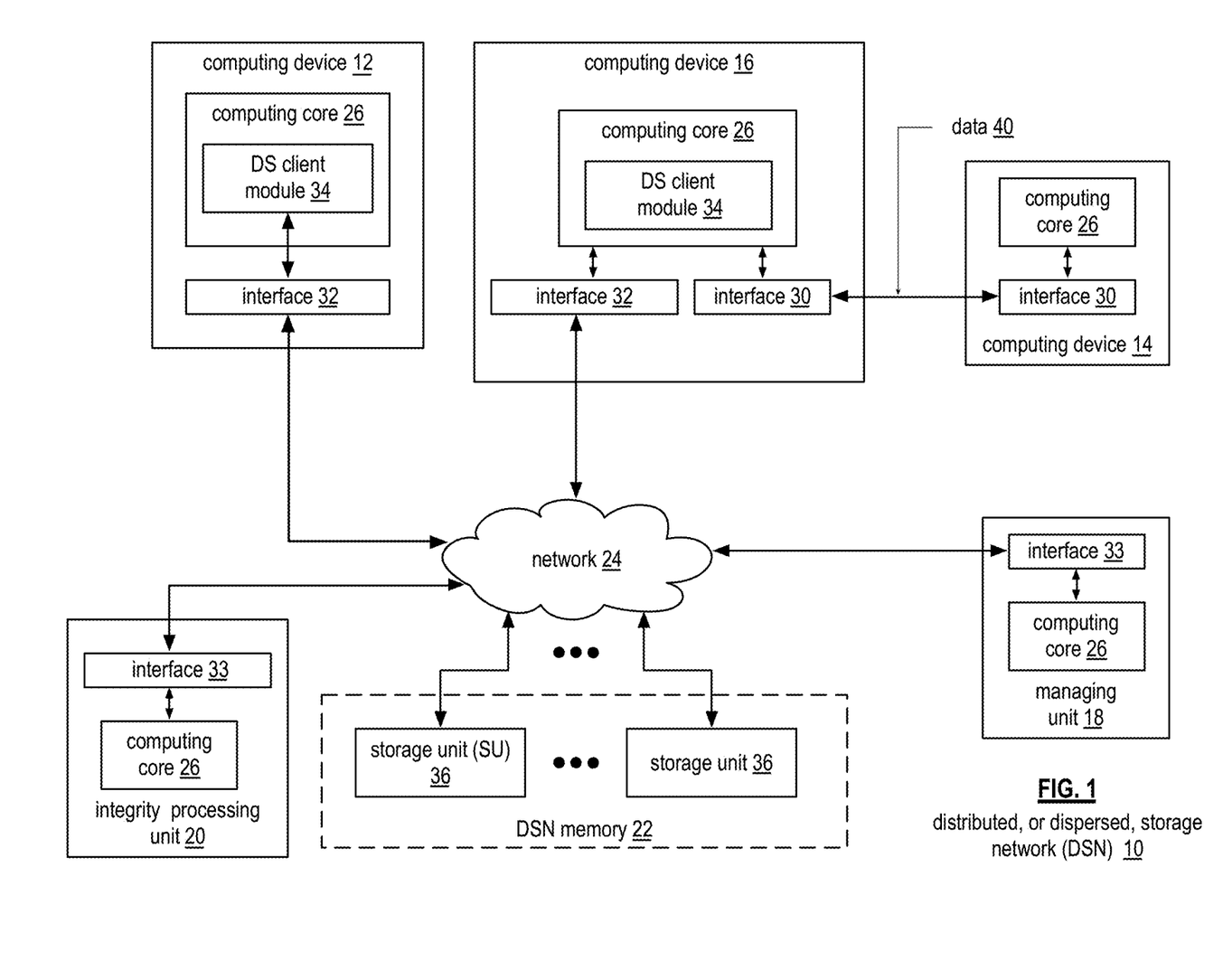
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
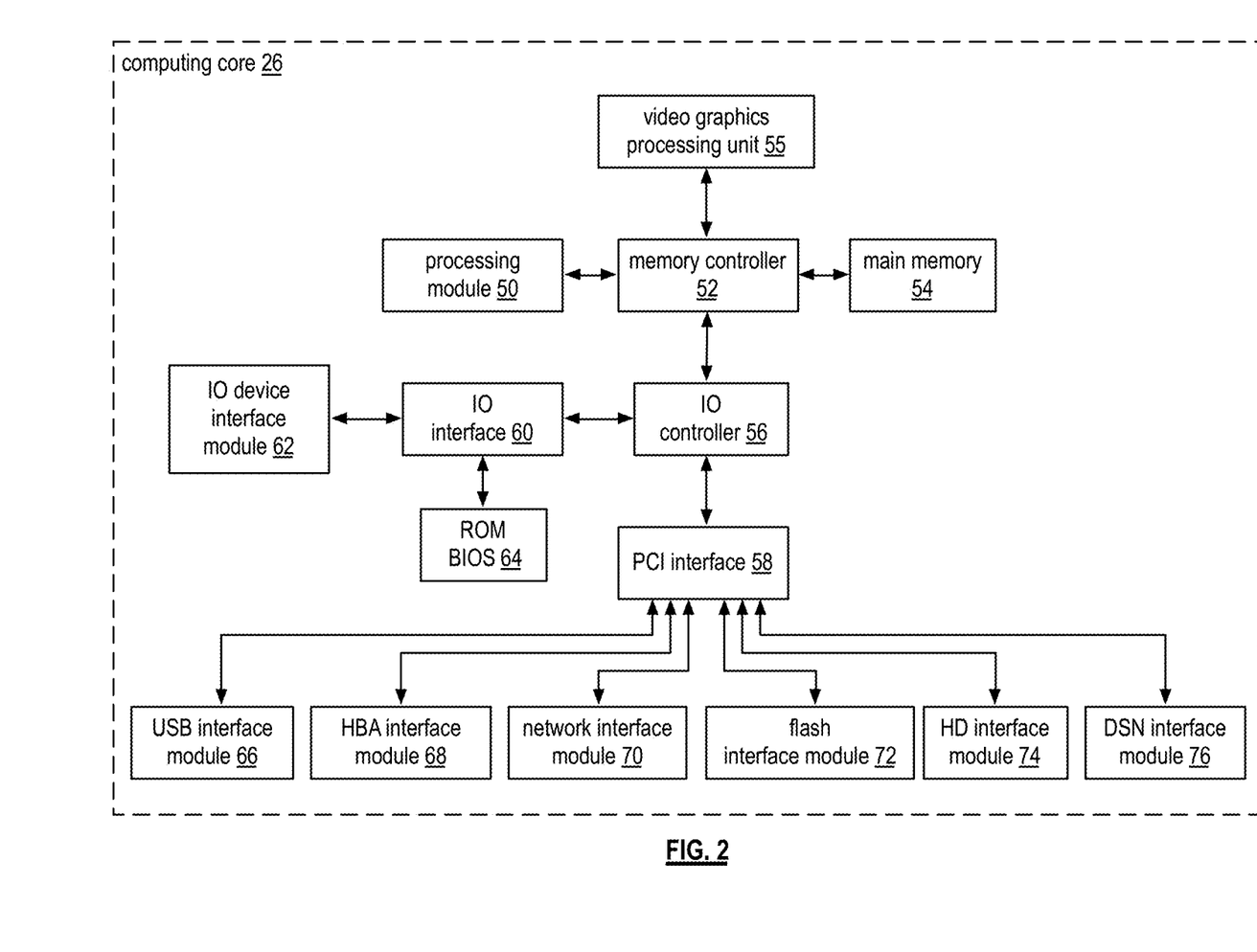
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
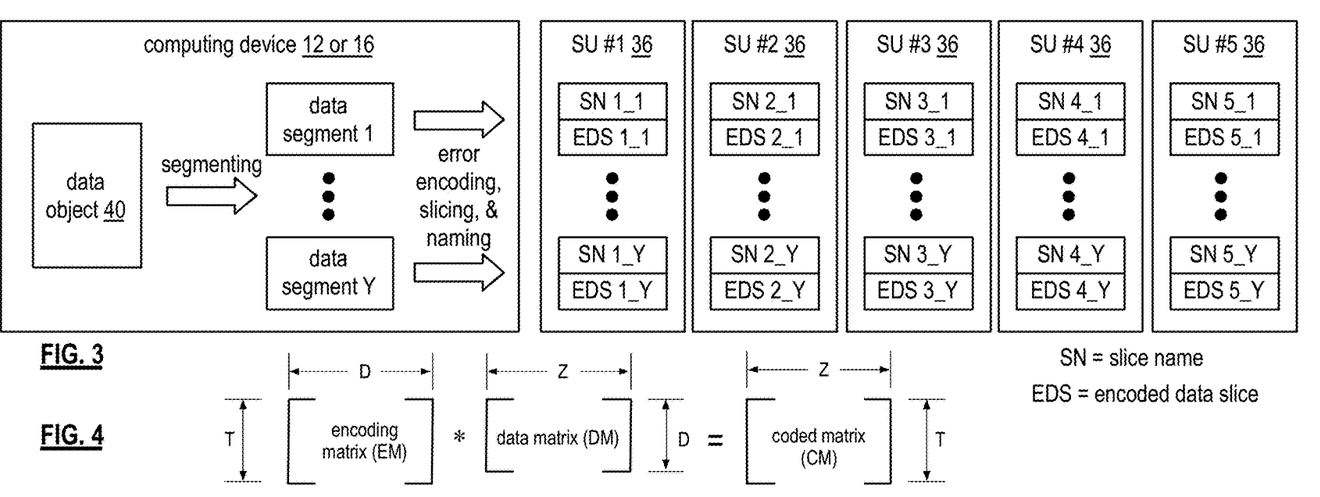
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
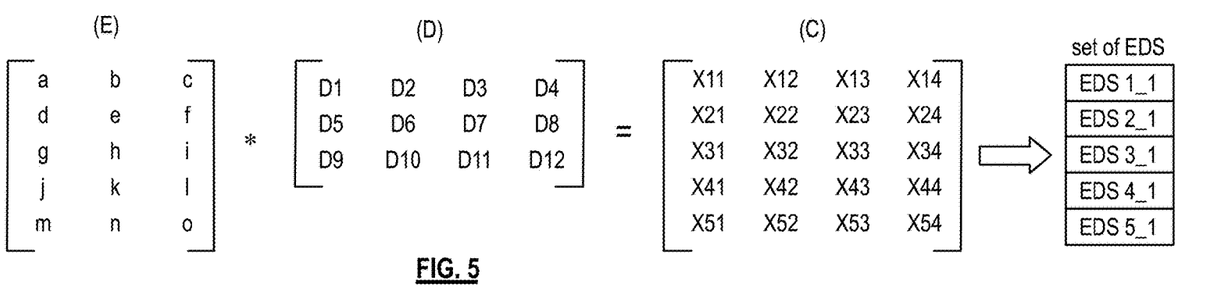
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
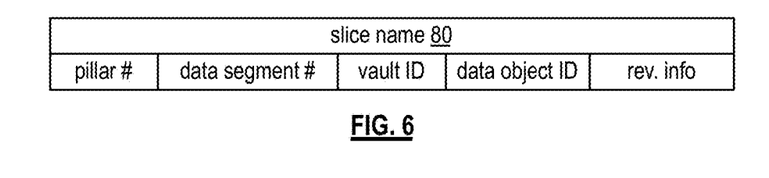
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
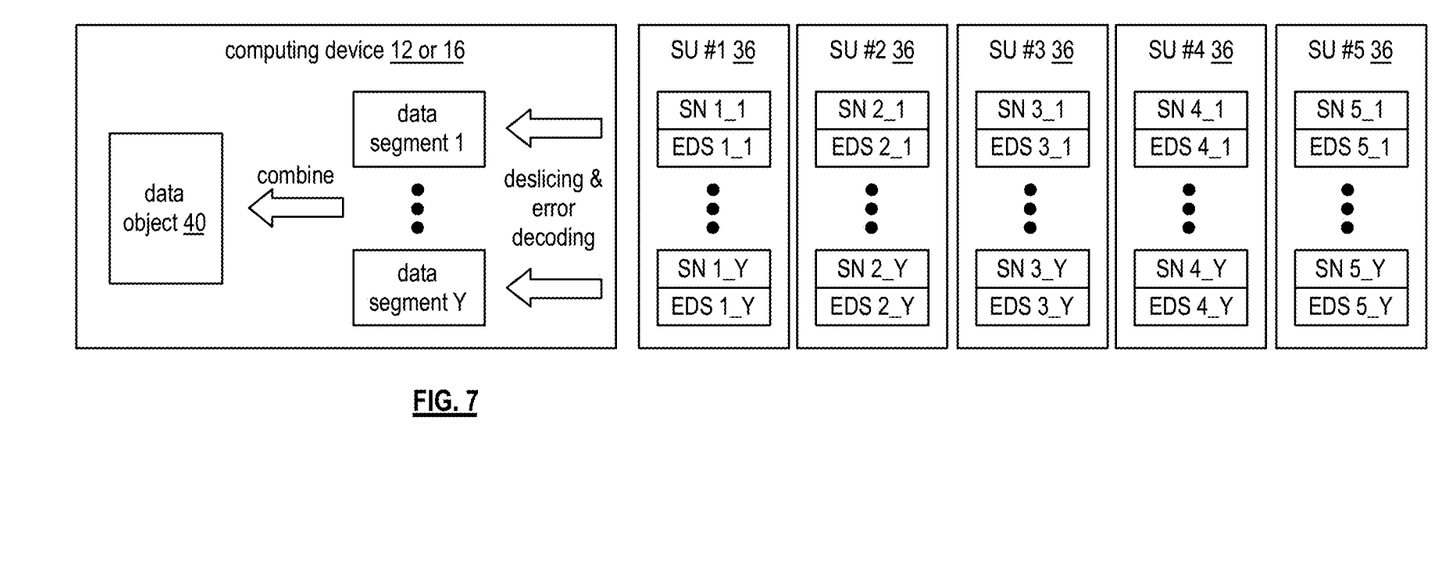
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
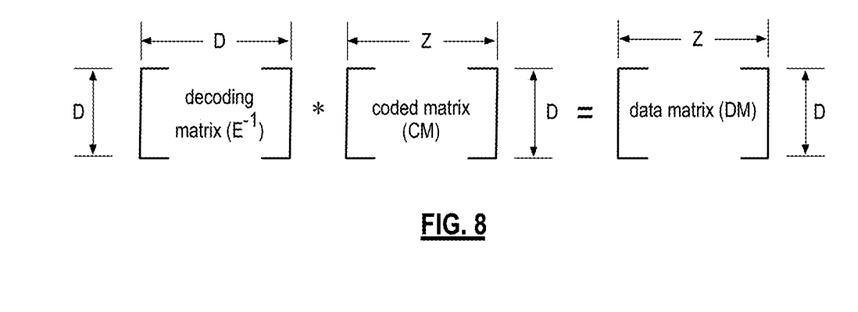
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
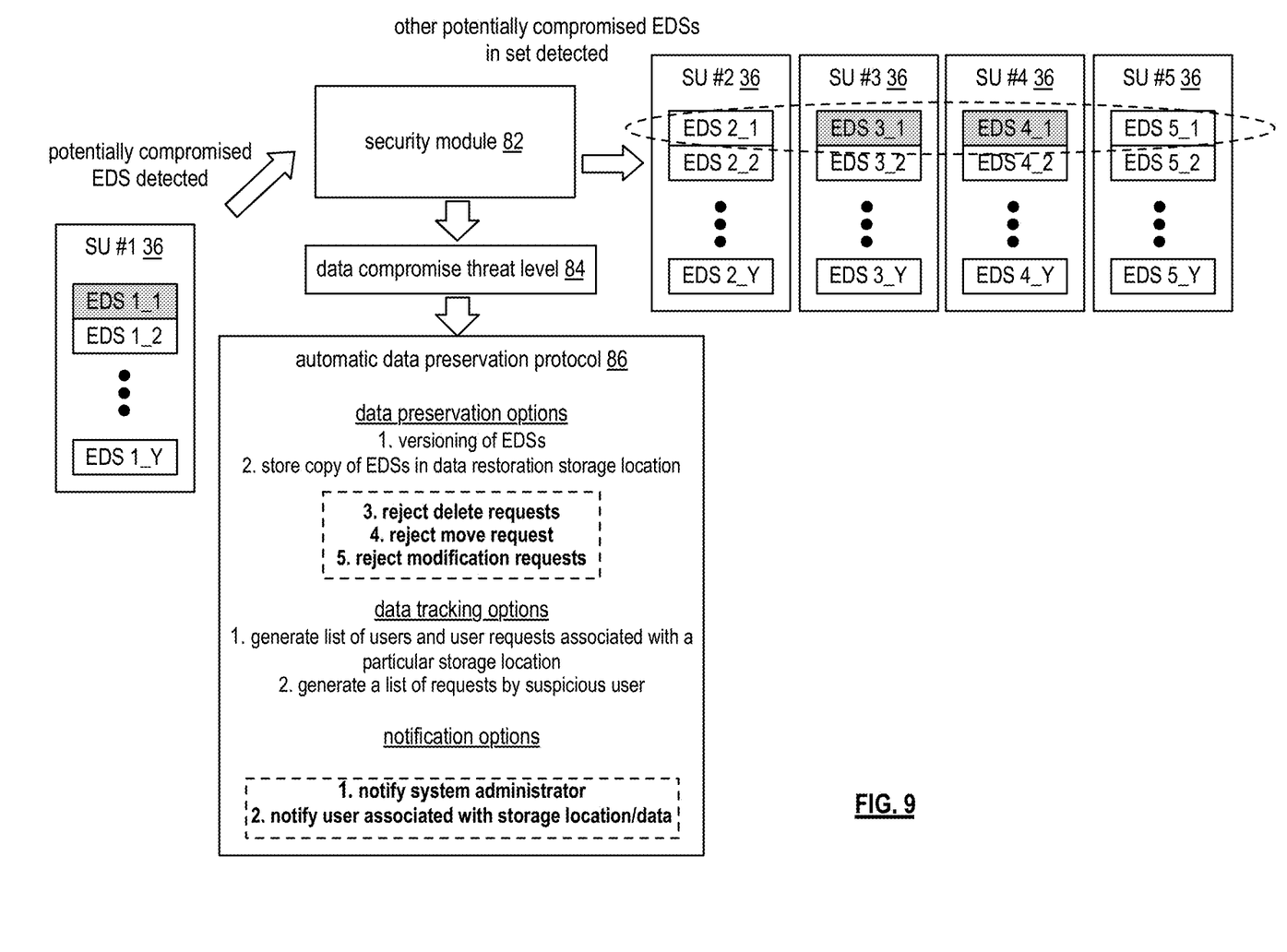
FIG. 9 is a schematic block diagram of another embodiment of the dispersed, or distributed, storage network (DSN) in accordance with the present invention.

FIG. 9 is a schematic block diagram of another embodiment of the dispersed, or distributed, storage network (DSN) that includes security module 82, and a set of storage units (SUs) #1-#5 36. Storage units #1-#5 store a plurality of sets of encoded data slices (EDSs) of a data object. For example, a data segment of a data object is dispersed storage error encoded to produce a set of encoded data slices. As a specific example, a first segment is dispersed storage error encoded to produce EDS 1_1, EDS 2_1, EDS 3_1, EDS 4_1, and EDS 5_1, EDS 1_1, EDS 2_1, EDS 3_1, EDS 4_1, and EDS 5_1 are distributed across SUs #1-#5 for storage (e.g., SU #1 stores EDS 1_1, SU #2 storage EDS 2_1, and so on).

Security module 82 may be part of managing unit 18 (e.g., managing unit 18 creates and stores security parameters and user profile information in local memory and/or within memory of the DSN memory 22) and/or a standalone device that is trusted by the managing unit 18 and has a computing core. Security module 82 stores and tracks user computing device authentication information (e.g., user login information, user account details, user credentials, etc.) and permissions pertaining to storage locations and data objects.

A storage location is one or more of: a storage container containing one or more sets of storage units, a logical storage vault, a portion of a logical storage vault (e.g., a storage "bucket"), a data file, a storage unit, and a portion of a storage unit. A user computing device may be affiliated with a particular storage location. For example, a user computing device is affiliated (e.g., has an authenticated account) with a portion of a logical storage vault spanning one or more sets of storage units such that the one or more sets of storage units represent the user computing device's memory space.

Security module 82 monitors storage units of the DSN for potentially compromised encoded data slices and automatically enables a data preservation protocol 86 when necessary. Monitoring the storage units includes analyzing requests by user computing devices of the DSN for certain suspicious actions. Requests include data access requests for encoded data slices of data objects (e.g., read requests, write requests, delete requests, modification requests, list slice requests, etc.) as well as user authentication and storage location management requests (e.g., requests to modify user authentication information, requests to modify ACLs, requests to delete/modify storage locations, etc.).

In this example, security module 82 detects a potentially compromised encoded data slice (EDS 1_1) of a set of encoded data slices (EDS 1_1, EDS 2_1, EDS 3_1, EDS 4_1, and EDS 5_1) stored in SU #1 of the set of storage units (SUs #1-#5). Security module 82 detects a potentially compromised encoded data slice (EDS 1_1) based on one or more suspicious conditions involving the encoded data slice. For example, security module 82 detects a request to delete EDS 1_1 from a user computing device of the DSN within a certain time period of writing EDS 1_1 and/or modifying EDS 1_1. This is considered suspicious because a delete request received shortly after a write or modification may indicate an accidental delete (e.g., if the same user computing device that wrote the slice now suddenly wishes to delete it) or a malicious action (e.g., if a different user computing device than the user computing device that wrote/modify the slice now wishes to delete it).

As another example, security module 82 detects a request to delete a storage location associated with EDS 1_1 within a certain time period of creation of the storage location and/or modification of the storage location. Similar to the example above, this is considered a suspicious action because a delete request received shortly after a write and/or modification may indicate an accidental delete or a malicious action. When a storage location includes multiple storage units, a request to delete a storage location shortly after creating/modifying the storage location would also alert security module 82 to multiple other potentially compromised encoded data slices within other storage units of the storage location.

As another example, security module 82 detects a request pertaining to EDS 1_1 (e.g., for EDS 1_1 or the storage location of EDS 1_1) by a suspicious user computing device. A suspicious user computing device may be a user computing device that is not associated with the data object or storage location of EDS 1_1, a user computing device that has made a certain amount of requests within a certain time period, a user computing device that has been inactive for a long period of time and is now active, and/or a user computing device that appears to executing an automated process to access data.

As another example, security module 82 detects a request to modify user authentication information associated with EDS 1_1 within a certain period of time of a successful encoded data slice operation. For example, EDS 1_1 is successfully modified and shortly thereafter a request to modify user authentication information associated with EDS 1_1 is detected. A request to suddenly change user authentication information after a successful operation could indicate that a malicious actor has gained access to the data.

As another example, security module 82 detects a request to delete EDS 1_1 within a certain period of time after detecting a request to change access control lists (ACLs) for the data object and/or the storage location associated with EDS 1_1.

As another example, security module 82 detects a request for an encoded data slice corresponding to a specific slice name. For example, EDS 1_1's slice name has been flagged based on previous security concerns and any request associated with EDS 1_1 alerts the security module 82. As another example, security module 82 detects a request for EDS 1_1 where EDS 1_1 corresponds to a specific data object type (e.g., a text file, jpeg, mp3, etc.). For example, certain data objects may be more prone to data compromise, thus the security module 82 routinely monitors requests associated with those data object types.

Because security module 82 detects that EDS 1_1 is potentially compromised, security module 82 monitors other storage units of the set of storage units (e.g., SUs #2-#5) in order to detect one or more other potentially compromised encoded data slices of the set of encoded data slices. Detecting the one or more other potentially compromised encoded data slices of the set of encoded data slices occurs in a similar manner as discussed above.

When the one or more other potentially compromised encoded data slices are detected, security module 82 determines a data compromise threat level 84 based on EDS 1_1 and the one or more other potentially compromised encoded data slices. In this example, security module 82 detects that EDS 3_1 in SU #3 and EDS 4_1 in SU #4 are also potentially compromised. Therefore, security module 82 determines data compromise threat level 84 based on EDS 1_1, EDS 3_1, and EDS 4_1.

Determining the data compromise threat level 84 is based on a total number of potentially compromised encoded data slices, a type of data compromise associated with compromised slices EDS 1_1, EDS 3_1, and EDS 4_1, a time period associated with compromised slices EDS 1_1, EDS 3_1, and EDS 4_1, and one or more user computing devices associated with compromised slices EDS 1_1, EDS 3_1, and EDS 4_1. For example, security module 82 determines that the data compromise threat level 84 compares unfavorably to a threat threshold (e.g., the threat level is high) when a decode threshold number of encoded data slices of the set of encoded data slices are potentially compromised. When a decode threshold number of encoded data slices are potentially compromised, the likelihood that a malicious actor has determined where and how encoded data slices are stored is high and the potential for data loss is significant.

Additionally, the security module 82 may determine that the data compromise threat level 84 compares unfavorably to the threat threshold when a specific amount of encoded data slices are determined to be potentially compromised within a certain time period (i.e., encoded data slices are getting compromised quickly), a same user computing device is responsible for more than one potentially compromised encoded data slice (i.e., it appears a user computing device may be acting maliciously), and/or the type of data compromise involves at least one of: a delete request, a request to modify user authentication information, and a request to change access control lists (ACLs).

In this example, the decode threshold number is three (e.g., three encoded data slices are required to reconstruct the data segment) thus the total number of potentially compromised encoded data slices (e.g., EDS 1_1, EDS 3_1, and EDS 4_1) is equal to the decode threshold number. Therefore, the security module 82 determines that the data compromise threat level 84 compares unfavorably to a threat threshold (e.g., the threat level is high).

Security module 82 enables an automatic data preservation protocol 86 based on the data compromise threat level 84. Automatic data preservation protocol 86 includes one or more data preservation options, one or more data tracking options, and one or more notification options. The data preservation options include 1) enabling versioning of potentially compromised encoded data slices, 2) reserving a copy of potentially compromised encoded data slices in data restoration storage location 88 of the DSN (not shown), 3) rejecting delete requests for the encoded data slices of the set of encoded data slices, 4) rejecting move requests for the encoded data slices of the set of encoded data slices, and 5) rejecting modification requests for the encoded data slices of the set of encoded data slices.

Versioning of potentially compromised encoded data slices is a feature that allows multiple versions of encoded data slices to be stored as opposed to a single latest version that overwrites previous versions. Versioning allows for requests to go through while still protecting the data. Data restoration storage location 88 is a storage location of the DSN reserved for storing copies of encoded data slices. If requests are allowed to go through, but actions later prove malicious, the original encoded data slice can be restored by security module 82 from data restoration storage location 88.

The one or more data tracking options include 1) for a storage location of the DSN associated with the potentially compromised encoded data slices, generating a list of all requests pertaining to the storage location and user computing devices associated with the requests, and 2) generating a list of requests made by a suspicious user computing device. The data tracking options establish an audit trail for potentially compromised encoded data slices. Tracking requests for a certain period of time may require an adjustment to the data compromise threat 84 and thus the automatic data preservation protocol 86. For example, data compromise threat 84 may start off as relatively low but after activity has been tracked for a period of time, the data compromise threat 84 may rise and require further security measures.

The one or more notification options include 1) sending a notification of potentially compromised encoded data slices to a system administrator of the DSN, and 2) sending a notification of potentially compromised encoded data slices to a user computing device associated with the potentially compromised encoded data slices.

In this example, the data compromise threat level 84 compares unfavorably to a threat threshold (e.g., the threat level is high) because a decode threshold number of EDSs are potentially compromised. When the data compromise threat level 84 compares unfavorably to a threat threshold, automatic data preservation protocol 86 includes 3) rejecting delete requests for the encoded data slices of the set of encoded data slices, 4) rejecting move requests for the encoded data slices of the set of encoded data slices, and 5) rejecting modification requests for the encoded data slices of the set of encoded data slices (e.g., a write once read many (WORM) retention scheme is implemented). Because the data compromise threat level 84 is considered high in this example, requests to tamper with the potentially compromised EDSs are rejected.

Further in this example, the automatic data preservation protocol 86 includes both notification options (e.g., 1) sending a notification of potentially compromised encoded data slices to a system administrator of the DSN, and 2) sending a notification of potentially compromised encoded data slices to a user computing device associated with the potentially compromised encoded data slices). With a high data compromise threat level 84, notifying both the system administrator and the authorized user computing device is particularly important so that further corrective measures can occur (e.g., a user can reset authentication information, a system administrator can block a malicious user from further access, etc.).

Figure 10:
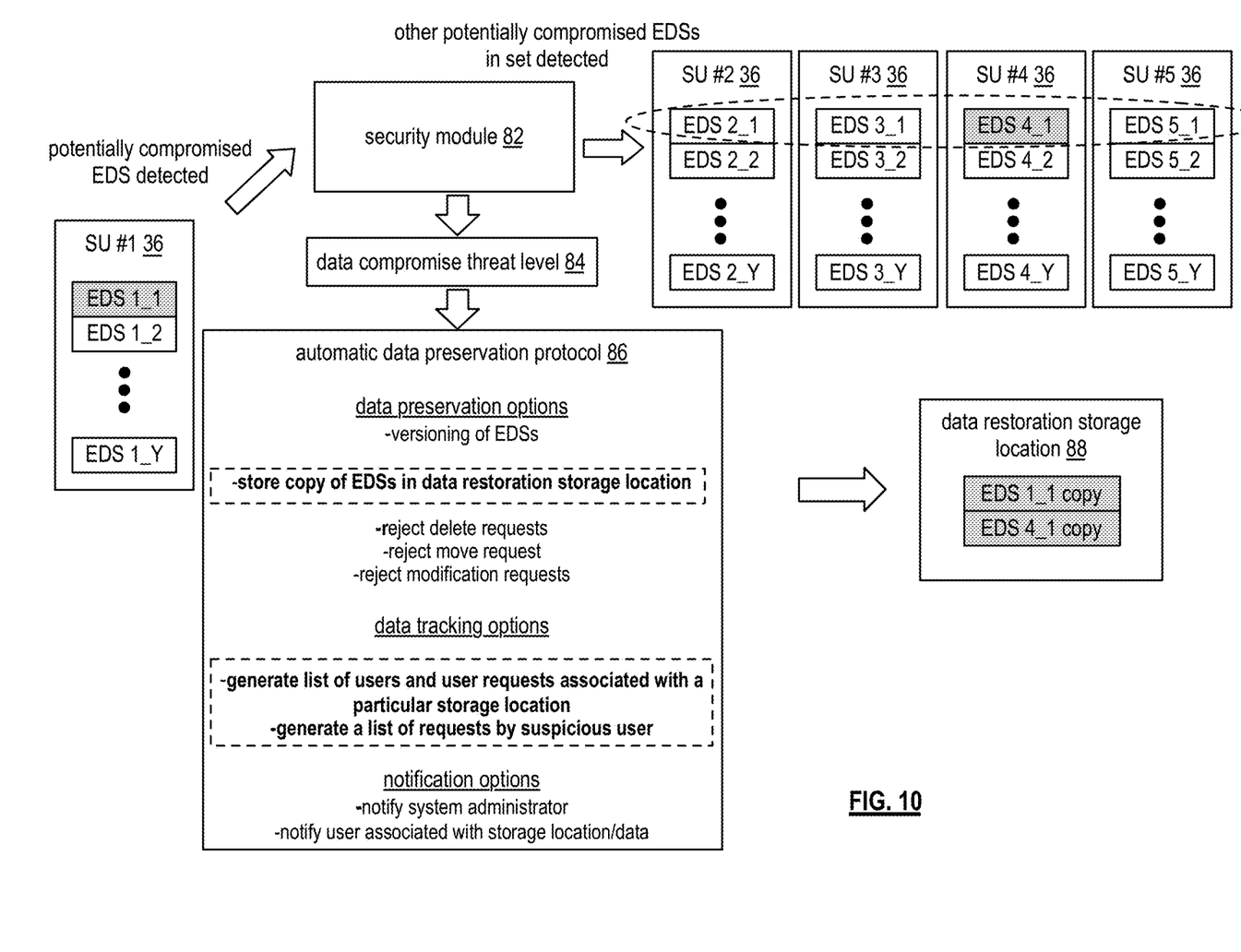
FIG. 10 is a schematic block diagram of another embodiment of the dispersed, or distributed, storage network (DSN) in accordance with the present invention.

FIG. 10 is a schematic block diagram of another embodiment of the dispersed, or distributed, storage network (DSN) that includes security module 82, a set of storage units (SUs) #1-#5 36, and data restoration storage location 88. FIG. 10 operates similarly to FIG. 9 except security module 82 detects only EDS 4_1 is potentially compromised within the other storage units (e.g., SUs #2-#5). Security module 82 determines a data compromise threat level 84 based on the potentially compromised encoded data slices (EDS 1_1 and EDS 4_1).

In this example, security module 82 determines that the data compromise threat level 84 compares favorably to a threat threshold (e.g., the threat level is low). For example, a decode threshold number of encoded data slices of the set of encoded data slices are not potentially compromised (e.g., only 2 are compromised and the decode threshold level is 3). Further, a specific amount of encoded data slices are not determined to be potentially compromised within a certain time period, different user computing devices are responsible for the potentially compromised encoded data slices, and the type of data compromise does not involve at least one of: a delete request, a request to modify user authentication information, and a request to change access control lists (ACLs).

Security module 82 enables the automatic data preservation protocol 86 based on the relatively low data compromise threat level 84. For example, the automatic data preservation protocol 86 allows requests involving the set of encoded data slices to come through but stores a copy of potentially compromised encoded data slices (EDS 1_1 and EDS 4_1) in data restoration storage location 88 in case the original version of EDS 1_1 and EDS 4_1 needs to be restored. Data restoration storage location 88 may store copies of EDS 1_1 and EDS 4_1 for a specified period of time (e.g., an hour to a day) and/or upon an indication from the security module 82 that EDS 1_1 and EDS 4_1 are no longer potentially compromised.

In this example, automatic data preservation protocol 86 also includes data tracking options 1) for a storage location of the DSN associated with the potentially compromised encoded data slices, generating a list of all requests pertaining to the storage location and user computing devices associated with the requests, and 2) generating a list of all requests made by a suspicious user computing device.

As a specific example, EDS 1_1 is considered potentially compromised because a user computing device that was inactive for a long period of time (e.g., a suspicious user computing device) made a request involving EDS 1_1, EDS 4_1 is considered potentially compromised because EDS

4_1 has a specific slice name that has been flagged as potentially compromised (e.g., EDS 4_1's slice name was flagged after EDS 4_1 was modified a certain amount of times within a certain time period). Based on this scenario, actions taken by the suspicious computing device are tracked (e.g., listed) and all requests pertaining to the storage location of the data object associated with EDS 1_1 and EDS 4_1 and user computing devices associated with those requests are tracked for further analysis. Security module 82 monitors all users and requests pertaining to the storage location of the data object for further suspicious activity.

The tracking may continue for a specified period of time (e.g., an hour or a day), and/or until security module 82 indicates that EDS 1_1 and EDS 4_1 are no longer considered potentially compromised (e.g., the suspicious activity discontinues). Lists may be stored in local and/or DSN memory for a certain period of time to identify suspicious actions and develop future security measures. For example, a list contains the actions of a suspicious user computing device over the course of a day. The suspicious activity discontinues, tracking stops, and the list is stored in local memory. If the suspicious user computing device continues activity at some later time, information from the stored list is used to assess the threat associated with this new activity (e.g., it appears the suspicious user using an automated process to access data, etc.).

In this example, automatic data preservation protocol 86 does not include any notification options. A benefit of the automatic data preservation protocol 86 is that security features are triggered based on certain events with no user intervention. Therefore, when the data compromise threat level 84 is considered relatively low, the automatic data preservation protocol 86 may proceed without user and/or system administrator knowledge or intervention.

Figure 11:
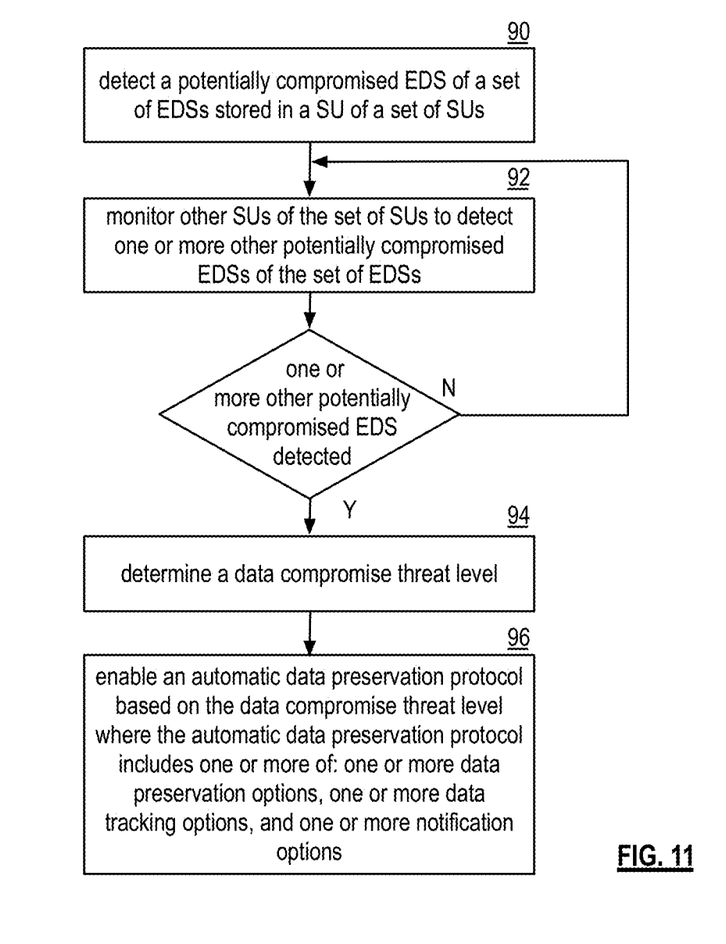
FIG. 11 is a logic diagram of an example of a method of automatic data preservation of potentially compromised encoded data slices in accordance with the present invention.

FIG. 11 is a logic diagram of an example of a method of automatic data preservation of potentially compromised encoded data slices (EDSs). The method begins with step 90 where a security module of a dispersed storage network (DSN) detects a potentially compromised encoded data slice of a set of encoded data slices. A data segment of a data object is dispersed storage error encoded to produce the set of encoded data slices, the set of encoded data slices is stored in a set of storage units (SUs) of the DSN, and the potentially compromised encoded data slice is stored in a storage unit of the set of storage units.

The security module may be part of managing unit 18 and/or a standalone device of the DSN that is trusted by the managing unit 18 and has a computing core. The security module stores and tracks user computing device authentication information (e.g., user login information, user account details, user credentials, etc.) and permissions (e.g., ability to manage access control lists (ACLs), etc.) pertaining to storage locations and data objects. Security module monitors storage units of the DSN for potentially compromised encoded data slices and automatically enables a data preservation protocol when necessary.

Monitoring the storage units includes analyzing requests by user computing devices of the DSN for certain suspicious actions. Requests include data access requests for encoded data slices of data objects (e.g., read requests, write requests, delete requests, modification requests, list slice requests, etc.) as well as user authentication and storage location management requests (e.g., requests to modify user authentication information, requests to modify ACLs, requests to delete/modify storage locations, etc.).

A storage location is one or more of: a storage container containing one or more sets of storage units, a logical storage vault, a portion of a logical storage vault (e.g., a storage "bucket"), a data file, a storage unit, and a portion of a storage unit. A user computing device may be affiliated with a particular storage location. For example, a user computing device is affiliated (e.g., has an authenticated account) with a portion of a logical storage vault spanning one or more sets of storage units such that the one or more sets of storage units represent the user computing device's memory space.

The security module detects a potentially compromised encoded data slice based on one or more suspicious conditions involving the encoded data slice. For example, the security module detects a request to delete an encoded data slice from a user computing device of the DSN within a certain time period of writing and/or modifying the encoded data slice. This is considered suspicious because a delete request received shortly after a write or modification may indicate an accidental delete (e.g., if the same user computing device that wrote the slice now suddenly wishes to delete it) or a malicious action (e.g., if a different user computing device than the user computing device that wrote/modify the slice now wishes to delete it).

As another example, the security module detects a request to delete a storage location associated with an encoded data slice within a certain time period of creation of the storage location and/or modification of the storage location. Similar to the example above, this is considered a suspicious action because a delete request received shortly after a write and/or modification may indicate an accidental delete or a malicious action. When the storage location includes multiple storage units, a request to delete a storage location shortly after creating/modifying the storage location alerts the security module to multiple other potentially compromised encoded data slices within other storage units of the storage location.

As another example, the security module detects a request by a suspicious user computing device. A suspicious user computing device may be a user computing device that is not associated with the data object or storage location of an encoded data slice, a user computing device that has made a certain amount of requests within a certain time period, a user computing device that has been inactive for a long period of time and it now active, and/or a user computing device that appears to executing an automated process to access data.

As another example, the security module detects a request to modify user authentication information associated with an encoded data slice within a certain period of time of a successful encoded data slice operation. For example, an encoded data slice is successfully modified and shortly thereafter a request to modify user authentication information associated with the encoded data slice is detected.

As another example, the security module detects a request to delete an encoded data slice within a certain period of time after detecting a request to change access control lists (ACLs) for the data object and/or the storage location associated with the encoded data slice.

As another example, the security module detects a request for an encoded data slice corresponding to a specific slice name. For example, an encoded data slice's slice name has been flagged and any request associated with the slice name alerts the security module. As another example, the security module detects a request for an encoded data slice that corresponds to a specific data object type (e.g., a text file, jpeg, mp3, etc.). For example, certain data objects may be more prone to data compromise, thus the security module routinely monitors requests associated with those data object types.

The method continues with step 92 where the security module monitors other storage units of the set of storage units in order to detect one or more other potentially compromised encoded data slices of the set of encoded data slices. Detecting the one or more other potentially compromised encoded data slices of the set of encoded data slices occurs in a similar manner as discussed above.

When the one or more other potentially compromised encoded data slices are detected, the method continues with step 94 where the security module determines a data compromise threat level based on the potentially compromised encoded data slice and the one or more other potentially compromised encoded data slices. When the one or more other potentially compromised encoded data slices are not detected, the method branches back to step 92 where monitoring is continued (e.g., for a certain amount of time and/or until the security module determines monitoring is no longer required).

Determining the data compromise threat level is based on a total number of potentially compromised encoded data slices, a type of data compromise associated with the potentially compromised encoded data slices, a time period associated with the potentially compromised encoded data slices, and one or more user computing devices associated with the potentially compromised encoded data slices. For example, the security module determines that the data compromise threat level compares unfavorably to a threat threshold (e.g., the threat level is high) when a decode threshold number of encoded data slices of the set of encoded data slices are potentially compromised. When a decode threshold number of encoded data slices are potentially compromised, the likelihood that a malicious actor has determined where and how encoded data slices are stored is high and the potential for data loss is significant.

Additionally, the security module may determine that the data compromise threat level compares unfavorably to the threat threshold when a specific amount of encoded data slices are determined to be potentially compromised within a certain time period (i.e., encoded data slices are getting compromised quickly), a same user computing device is responsible for more than one potentially compromised encoded data slice (i.e., it appears a user computing device may be acting maliciously), and/or the type of data compromise involves at least one of: a delete request, a request to modify user authentication information, and a request to change access control lists (ACLs).

The method continues with step 96 where the security module enables an automatic data preservation protocol based on the data compromise threat level. The automatic data preservation protocol includes one or more of: one or more data preservation options, one or more data tracking options, and one or more notification options.

The data preservation options include 1) enabling versioning of potentially compromised encoded data slices, 2) reserving a copy of potentially compromised encoded data slices in a data restoration storage location of the DSN, 3) rejecting delete requests for the encoded data slices of the set of encoded data slices, 4) rejecting move requests for the encoded data slices of the set of encoded data slices; and 5) rejecting modification requests for the encoded data slices of the set of encoded data slices.

Versioning of potentially compromised encoded data slices is a feature that allows multiple versions of encoded data slices to be stored as opposed to a single latest version that overwrites previous versions. Versioning allows for requests to go through while still protecting the data. The data restoration storage location is a storage location of the DSN reserved for storing copies of encoded data slices. If requests are allowed to go through, but actions later prove malicious, the original encoded data slice can be restored by security module from the data restoration storage location.

The one or more data tracking options include 1) for a storage location of the DSN associated with the potentially compromised encoded data slices, generating a list of all requests pertaining to the storage location and user computing devices associated with the requests, and 2) generating a list of all requests made by a suspicious user computing device. The data tracking options establish an audit trail for potentially compromised encoded data slices. Tracking data for a certain period of time may require an adjustment to the data compromise threat and thus the automatic data preservation protocol. For example, the data compromise threat may start off as relatively low but after activity has been tracked for a period of time, the data compromise threat may rise and require further security measures.

The one or more notification options include 1) sending a notification of potentially compromised encoded data slices to a system administrator of the DSN, and 2) sending a notification of potentially compromised encoded data slices to a user computing device associated with the potentially compromised encoded data slices.

When the data compromise threat level compares unfavorably to a threat threshold, automatic data preservation protocol includes 3) rejecting delete requests for the encoded data slices of the set of encoded data slices, 4) rejecting move requests for the encoded data slices of the set of encoded data slices; and 5) rejecting modification requests for the encoded data slices of the set of encoded data slices. Because the data compromise threat level is considered high, requests to alter the potentially compromised encoded data slices are rejected.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    detecting, by a security module of a dispersed storage network (DSN), a potentially compromised encoded data slice of a set of encoded data slices, wherein a data segment of a data object is dispersed storage error encoded to produce the set of encoded data slices, wherein the set of encoded data slices is stored in a set of storage units of the DSN, and wherein the potentially compromised encoded data slice is stored in a storage unit of the set of storage units;
    monitoring, by the security module, other storage units of the set of storage units in order to detect one or more other potentially compromised encoded data slices of the set of encoded data slices; and
    when the one or more other potentially compromised encoded data slices are detected:
        determining, by the security module, a data compromise threat level based on a total number of potentially compromised encoded data slices, a type of data compromise associated with the potentially compromised encoded data slices, a time period associated with the potentially compromised encoded data slices, and one or more user computing devices associated with the potentially compromised encoded data slices; and
        enabling, by the security module, an automatic data preservation protocol based on the data compromise threat level, wherein the automatic data preservation protocol includes: one or more data preservation options, one or more data tracking options, and one or more notification options.

2. The method of claim 1, wherein detecting one or more of: the potentially compromised encoded data slice and the one or more other potentially compromised encoded data slices includes one or more of:
    detecting, by the security module, a request to delete an encoded data slice within a certain time period of one or more of: writing the encoded data slice and modification of the encoded data slice;
    detecting, by the security module, a request to delete a storage location of an encoded data slice within a certain time period of one or more of: creation of the storage location and modification of the storage location;
    detecting, by the security module, a request by a suspicious user computing device;
    detecting, by the security module, a request to modify user authentication information within a certain period of time of a successful encoded data slice operation;
    detecting, by the security module, a request to delete an encoded data slice within a certain period of time after detecting a request to change access control lists (ACLs) for the data object;
    detecting, by the security module, a request to delete a storage location of an encoded data slice within a certain period of time after detecting a request to change access control lists (ACLs) for the storage location;
    detecting, by the security module, a request for an encoded data slice corresponding to a specific slice name; and
    detecting, by the security module, a request for an encoded data slice corresponding to a specific data object type.

3. The method of claim 1, wherein the one or more data preservation options include:
    enabling, by the security module, versioning of one or more of: the potentially compromised encoded data slice and the one or more other potentially compromised encoded data slices;
    reserving, by the security module, a copy of one or more of: the potentially compromised encoded data slice and the one or more other potentially compromised encoded data slices in a data restoration storage location of the DSN;
    rejecting, by the security module, delete requests for the encoded data slices of the set of encoded data slices;

rejecting, by the security module, move requests for the encoded data slices of the set of encoded data slices; and rejecting, by the security module, modification requests for the encoded data slices of the set of encoded data slices.

4. The method of claim 1, wherein the one or more data tracking options include:

for a storage location of the DSN associated with one or more of: the potentially compromised encoded data slice and the one or more other potentially compromised encoded data slices, generating, by the security module, a list of all requests pertaining to the storage location and user computing devices associated with the requests; and generating, by the security module, a list of all requests made by a suspicious user computing device.

5. The method of claim 1, wherein the one or more notification options include:

sending, by the security module, a notification of one or more of: the potentially compromised encoded data slice and the one or more other potentially compromised encoded data slices to a system administrator of the DSN; and sending, by the security module, a notification of one or more of: the potentially compromised encoded data slice and the one or more other potentially compromised encoded data slices to a user computing device associated with one or more of: the potentially compromised encoded data slice and the one or more other potentially compromised encoded data slices.

6. The method of claim 1, further comprising:

determining, by the security module, that the data compromise threat level compares unfavorably to a threat threshold based on one or more of:

a decode threshold number of encoded data slices of the set of encoded data slices are potentially compromised;

a specific amount of encoded data slices are determined to be potentially compromised within a certain time period;

a same user computing device is responsible for more than one potentially compromised encoded data slice; and a type of data compromise involves at least one of: a delete request, a request to modify user authentication information, and a request to change access control lists (ACLs).

7. The method of claim 1, further comprising:

when the data compromise threat level compares unfavorably to a threat threshold, the automatic data preservation protocol includes at least one of:

rejecting, by the security module, delete requests for the encoded data slices of the set of encoded data slices;

rejecting, by the security module, move requests for the encoded data slices; and rejecting, by the security module, modification requests for the encoded data slices.

8. The method of claim 1, wherein the one or more user computing devices associated with the potentially compromised encoded data slices are not associated with the data object.

9. The method of claim 8, further comprising detecting a request to modify user authentication information associated with an encoded data slice within a certain period of time of a successful encoded data slice operation, wherein the successful encoded data slice operation includes modifying the encoded data slice.

10. The method of claim 9, further comprising determining that the data compromise threat level compares unfavorably to a threat threshold when a specific amount of encoded data slices of the set of encoded data slices are determined to be potentially compromised within a certain time period, a same user computing device is responsible for more than one potentially compromised encoded data slice, and the type of data compromise involves: a delete request, a request to modify user authentication information, and a request to change access control lists (ACLs).

11. The method of claim 10, wherein the automatic data preservation protocol includes:

enabling versioning of the potentially compromised encoded data slices;

reserving a copy of the potentially compromised encoded data slices in a data restoration storage location of the DSN;

rejecting delete requests for the set of encoded data slices;

rejecting move requests for the set of encoded data slices; and rejecting modification requests for the set of encoded data slices.

12. The method of claim 11, wherein the versioning of the potentially compromised encoded data slices allows multiple versions of the set of encoded data slices to be stored as opposed to a single latest version that overwrites previous versions.

13. The method of claim 12, wherein the one or more data tracking options establish an audit trail for potentially compromised encoded data slices.

14. A security module of a dispersed storage network (DSN), the security module comprises:

an interface;

memory; and a processing module operably coupled to the memory and the interface, wherein the processing module is operable to:

detect a potentially compromised encoded data slice of a set of encoded data slices, wherein a data segment of a data object is dispersed storage error encoded to produce the set of encoded data slices, wherein the set of encoded data slices is stored in a set of storage units of the DSN, and wherein the potentially compromised encoded data slice is stored in a storage unit of the set of storage units;

monitor other storage units of the set of storage units in order to detect one or more other potentially compromised encoded data slices of the set of encoded data slices; and when the one or more other potentially compromised encoded data slices are detected:

determine a data compromise threat level based on a total number of potentially compromised encoded data slices, a type of data compromise associated with the potentially compromised encoded data slices, a time period associated with the potentially compromised encoded data slices, and one or more user computing devices associated with the potentially compromised encoded data slices; and enable an automatic data preservation protocol based on the data compromise threat level, wherein the automatic data preservation protocol includes: one or more data preservation options, one or more data tracking options, and one or more notification options.

15. The security module of claim 14, wherein the processing module is operable to detect one or more of: the potentially compromised encoded data slice and the one or more other potentially compromised encoded data slices by one or more of:
   detecting a request to delete an encoded data slice within a certain time period of one or more of:
   writing the encoded data slice and modification of the encoded data slice;
   detecting a request to delete a storage location of an encoded data slice within a certain time period of one or more of: creation of the storage location and modification of the storage location;
   detecting a request by a suspicious user computing device;
   detecting a request to modify user authentication information within a certain period of time of a successful encoded data slice operation;
   detecting a request to delete an encoded data slice within a certain period of time after detecting a request to change access control lists (ACLs) for the data object;
   detecting a request to delete a storage location of an encoded data slice within a certain period of time after detecting a request to change access control lists (ACLs) for the storage location;
   detecting a request for an encoded data slice corresponding to a specific slice name; and
   detecting a request for an encoded data slice corresponding to a specific data object type.

16. The security module of claim 14, wherein the one or more data preservation options include:
   enabling versioning of one or more of: the potentially compromised encoded data slice and the one or more other potentially compromised encoded data slices;
   reserving a copy of one or more of: the potentially compromised encoded data slice and the one or more other potentially compromised encoded data slices in a data restoration storage location of the DSN;
   rejecting delete requests for the encoded data slices of the set of encoded data slices;
   rejecting move requests for the encoded data slices of the set of encoded data slices; and
   rejecting modification requests for the encoded data slices of the set of encoded data slices.

17. The security module of claim 14, wherein the one or more data tracking options include:
   for a storage location of the DSN associated with one or more of: the potentially compromised encoded data slice and the one or more other potentially compromised encoded data slices, generating a list of all requests pertaining to the storage location and user computing devices associated with the requests; and
   generating a list of all requests made by a suspicious user computing device.

18. The security module of claim 14, wherein the one or more notification options include:
   sending a notification of one or more of: the potentially compromised encoded data slice and the one or more other potentially compromised encoded data slices to a system administrator of the DSN; and
   sending a notification of one or more of: the potentially compromised encoded data slice and the one or more other potentially compromised encoded data slices to a user computing device associated with one or more of: the potentially compromised encoded data slice and the one or more other potentially compromised encoded data slices.

19. The security module of claim 14, wherein the processing module is further operable to:
   determine that the data compromise threat level compares unfavorably to a threat threshold based on one or more of:
      a decode threshold number of encoded data slices of the set of encoded data slices are potentially compromised;
      a specific amount of encoded data slices are determined to be potentially compromised within a certain time period;
      a same user computing device is responsible for more than one potentially compromised encoded data slice; and
      a type of data compromise involves at least one of: a delete request, a request to modify user authentication information, and a request to change access control lists (ACLs).

20. The security module of claim 14, further comprises:
   when the data compromise threat level compares unfavorably to a threat threshold, the automatic data preservation protocol includes at least one of:
      rejecting delete requests for the encoded data slices of the set of encoded data slices;
      rejecting move requests for the encoded data slices; and
      rejecting modification requests for the encoded data slices.

* * * * *